UNITED STATES PATENT OFFICE.

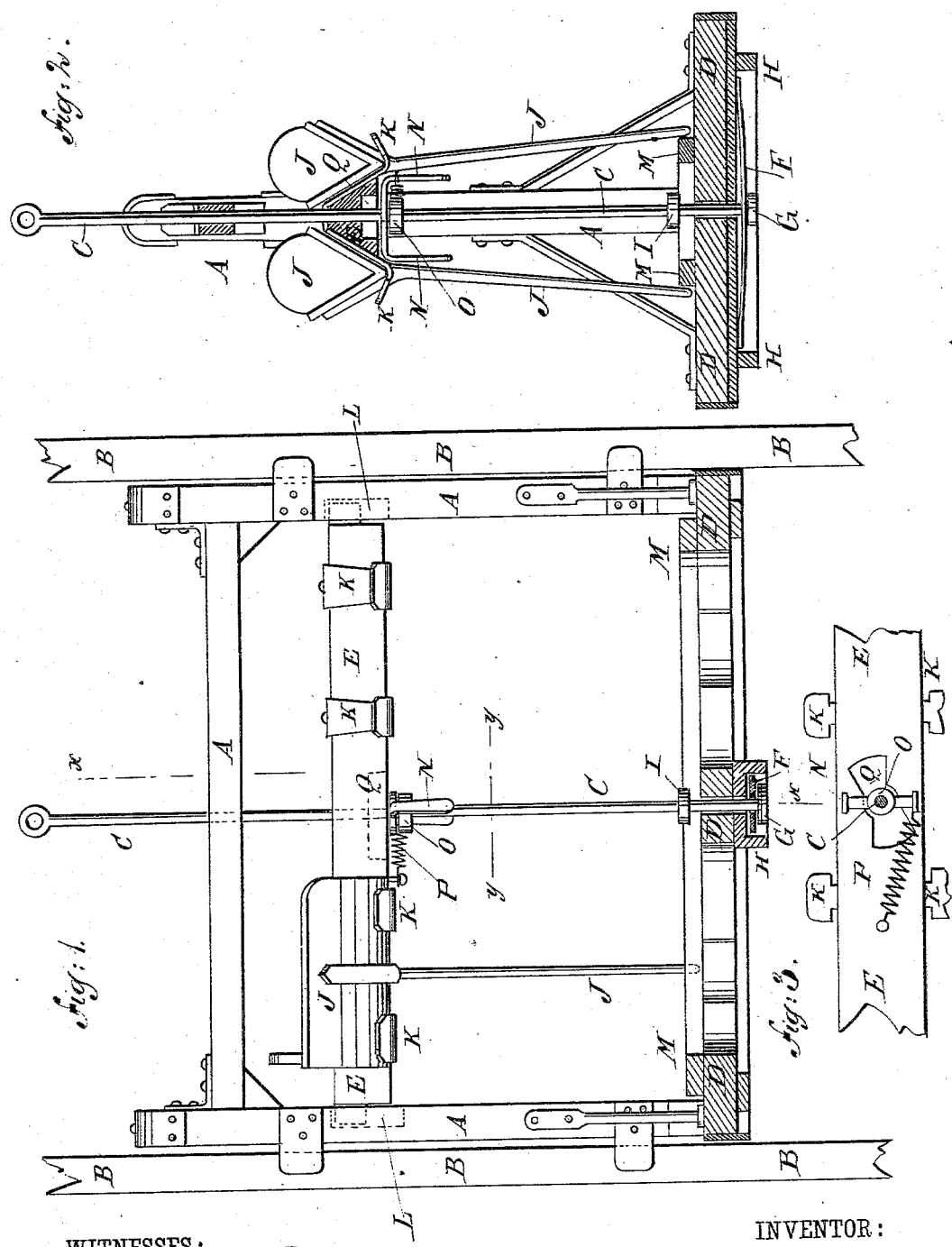

FRANKLIN PIERCE, OF NEW YORK, N. Y.

HOD-ELEVATOR.

SPECIFICATION forming part of Letters Patent No. 283,655, dated August 21, 1883.

Application filed March 14, 1883. (No model.)

*To all whom it may concern:*

Be it known that I, FRANKLIN PIERCE, of the city, county, and State of New York, have invented a new and useful Improvement in Hod-Elevators, of which the following is a full, clear, and exact description.

Reference is to be had to the accompanying drawings, forming a part of this specification, in which similar letters of reference indicate corresponding parts in all the figures.

Figure 1 is a front elevation of my improvement, the platform being shown in section. Fig. 2 is a sectional end elevation of the same taken through the line $x\ x$, Fig. 1. Fig. 3 is an under side view of the middle part of the hod-carrying bar, the hoisting-rod being shown in section through the line $y\ y$, Fig. 1.

The object of this invention is to improve the construction of the hod-elevators for which Letters Patent No. 267,248 were issued November 7, 1882, in such a manner as to make them more convenient in use.

The invention consists in the hod-elevator constructed with a cross-bar provided with a spring and placed upon the hoisting-rod beneath the vertically-moving hod-carrying bar, provided with an inclined groove in its lower side, whereby the said bar will be supported while carrying the hods and can be allowed to drop to lower the hods to the platform, withdraw the supporting-hooks from the said hods and allow the said hods to be swung outward without being raised from the platform. With the lower end of the hoisting-rod is connected a spring, which rests against the lower side of the platform, and is designed to lower the said rod when released from the hoisting-strain, to withdraw the cross-bar from the groove in the hod-carrying bar and allow the said cross-bar to be turned by its spring, as will be hereinafter fully described.

A represents the frame of the elevator, which slides up and down upon ways B in the ordinary manner.

C is the hoisting-rod, to which the ordinary hoisting-chain is attached, and which passes through the centers of the top bar of the frame A, the platform D, and the hod-carrying bar E. The hoisting-rod C also passes through a half-elliptic spring, F, and has a collar or nut, G, attached to its lower end. The spring F is kept in place and protected by a box, H, attached to the lower side of the platform D, and the ends of the said spring rest against the said lower side of the platform D, or against a wear-plate attached to the said lower side. The downward movement of the hoisting-rod C is limited by a collar or nut, I, attached to the said rod above the platform D. With this construction, when the elevator is supported by the rod C, the weight of the frame A and its attachments rests upon the collar G, putting the spring F under tension. When the elevator is lowered and the hoisting-strain is withdrawn from the rod C, the elasticity of the spring F forces the said rod C downward till the collar I rests upon the upper side of the platform D. The opposite sides of the bar E are beveled to receive the inclined sides of the hods J, and have angle irons or hooks K attached to them to receive the angular bottoms of the said hods J. The ends of the bar E, or tenons formed upon the said ends, move up and down in grooves L in the vertical side bars of the frame A, which grooves are made of such a length that when the ends of the bar E are at the upper ends of the said grooves the ends of the handles of the hods J will be raised from the platform D and will rest against a frame, M, attached to the upper side of the said platform or to the side bars of the frame A, and when the ends of the bar E are at the lower ends of the grooves L the ends of the handles of the hods J will rest upon the platform D, and the hooks K will be so far below the angular bottoms of the hods J that the said hods can be swung outward for the hod-carrier to place his shoulder beneath them without raising the weight of the said hods off the platform D.

Upon the hoisting-rod C, beneath the bar E, is placed a cross-bar, N, the ends of which are bent downward to serve as handles in turning it. The cross-bar N rests upon a collar or nut, O, attached to the hoisting-rod C in such a position that when the said rod C is under a hoisting-strain and the bar N is crosswise of the bar E the said bar E will rest upon the cross-bar N, and will be held at the upper ends of the grooves L and will support the hods J, with the ends of their handles raised from the platform D; and when the hoisting-strain is withdrawn from the rod C, and the said rod is forced downward by the tension of the spring F, the cross-bar N will be a little below the lower side of the bar E, so that it can be turned into and held in position crosswise of the said bar E by the tension of a spiral or other spring, P, attached at one end to an end part of the bar N, and attached at its other end to the said bar E.

In the lower side of the central part of the bar E is formed an inclined groove, Q, of such a length and size as to receive the bar N, and of sufficient depth to allow the bar E to drop to the lower parts of the grooves L when the rod C is under a hoisting-strain, and the bar N is turned into line with the said groove Q.

In using the elevator, when the elevator is lowered and the hoisting-strain is withdrawn from the rod C, leaving the bar E at the lower ends of the grooves L, the hod-carriers place the ends of their hod-handles upon the platform D and swing the hods against the bar E, above the hooks K. When a hoisting-strain is applied to the rod C, the cross-bar N raises the bar E, bringing the hooks K against the bottoms of the hods J, and raising the said hods until the lower ends of the hod-handles are raised from the platform D and rest against the frame M, so that the hods will be securely supported while being elevated. When the elevator reaches the end of its upward movement and is stopped, an attendant turns the bar N into line with the groove Q, which allows the bar E to drop to the lower ends of the grooves L and withdraws the hooks K from the hods J, so that the hod-carriers, without raising the hods J from the platform D, can swing the said hods outward and place their shoulders beneath them. When the elevator reaches the end of its downward movement and the hoisting-strain is removed from the rod C, the tension of the spring F forces the said rod C downward, withdrawing the cross-bar N from the groove Q and allowing the tension of the spring P to turn the said bar N crosswise of the bar E, ready to raise the said bar E and the hods J when a hoisting-strain is again applied to the rod C.

Having thus described my invention, I claim as new and desire to secure by Letters Patent—

1. In a hod-elevator, the combination, with the hoisting-rod C and the vertically-moving hod-carrying bar E, having inclined grooves Q, of the cross-bar N and spring P, substantially as herein shown and described, whereby the said bar will be supported while carrying the hods, and can be allowed to drop to lower the hods to the platform, withdraw the supporting-hooks from the said hods and allow the hods to be swung outward without being raised from the platform, as set forth.

2. In a hod-elevator, the combination, with the platform D and the hoisting-rod C, of the spring F, substantially as herein shown and described, whereby the hoisting-rod, when released from the hoisting-strain, will be lowered to withdraw the cross-bar from the groove in the hod-carrying bar, and allow the said cross-bar to be turned by its spring, as set forth.

FRANKLIN PIERCE.

Witnesses:
   EDW. M. CLARK,
   C. SEDGWICK.